United States Patent
Hagi

(10) Patent No.: US 10,696,247 B1
(45) Date of Patent: Jun. 30, 2020

(54) WIRE HARNESS

(71) Applicants: AUTONETWORKS TECHNOLOGIES, LTD., Yokkaichi-shi, Mie-ken (JP); SUMITOMO WIRING SYSTEMS, LTD., Yokkaichi-shi, Mie-ken (JP); SUMITOMO ELECTRIC INDUSTRIES, LTD., Osaka-shi, Osaka (JP)

(72) Inventor: Masahiro Hagi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/627,898

(22) PCT Filed: Aug. 30, 2018

(86) PCT No.: PCT/JP2018/032191
§ 371 (c)(1),
(2) Date: Dec. 31, 2019

(87) PCT Pub. No.: WO2019/058921
PCT Pub. Date: Mar. 28, 2019

(30) Foreign Application Priority Data

Sep. 19, 2017 (JP) .................................. 2017-179024

(51) Int. Cl.
*B60R 16/02* (2006.01)
*H01B 7/02* (2006.01)

(52) U.S. Cl.
CPC ....... *B60R 16/0215* (2013.01); *H01B 7/0216* (2013.01)

(58) Field of Classification Search
CPC .......................... B60R 16/0215; H01B 7/0216
USPC ......................................................... 174/72 A
See application file for complete search history.

(56) References Cited

U.S. PATENT DOCUMENTS

| 2004/0099427 | A1 | 5/2004 | Kihira |
| 2009/0095525 | A1 | 4/2009 | Watanabe |
| 2011/0005805 | A1 | 1/2011 | Eshima |
| 2011/0155458 | A1* | 6/2011 | Kato ................... B60R 16/0215 174/74 R |

(Continued)

FOREIGN PATENT DOCUMENTS

| JP | 2009-100586 A | 5/2009 |
| JP | 2009-123673 A | 6/2009 |

OTHER PUBLICATIONS

Oct. 30, 2018 International Search Report issued in International Patent Application No. PCT/JP2018/032191.

*Primary Examiner* — Sherman Ng
(74) *Attorney, Agent, or Firm* — Oliff PLC

(57) ABSTRACT

A wire harness has: wires each including a core wire that is formed from a conductor and an insulating covering that covers the outer periphery of the core wire; and an exterior material and a braided member, into which the wires are inserted. Each wire has a removed-covering section where the insulating covering has been removed partway in the longitudinal direction. The removed-covering section is covered by a webbed covering member, the outer periphery of which has insulating properties.

5 Claims, 3 Drawing Sheets

(56) References Cited

U.S. PATENT DOCUMENTS

2015/0279514 A1* 10/2015 Sato .................... B60R 16/0207
174/72 A

* cited by examiner

WIRE HARNESS

TECHNICAL FIELD

The present disclosure relates to a wire harness.

BACKGROUND ART

Conventionally, a wire harness used for a vehicle such as a hybrid car or an electric car includes electric wires that electrically connect electric devices such as a high voltage battery or an inverter (for example, refer to Patent Document 1).

In the wire harness disclosed in Patent Document 1, an exterior member such as a corrugated tube or a metal pipe covers the outer sides of wires to protect and electromagnetically shield the wires.

PRIOR ART LITERATURE

Patent Literature

Patent Document 1: Japanese Laid-Open Patent Publication No. 2004-171952

SUMMARY

Problem to be Solved

As described above, the electric devices used for a hybrid car, an electric car, or the like include high voltage inverters, batteries, and the like. A current of, for example, several hundred amperes flows through a wire and readily increases the temperature of the wire. Thus, there is a need to improve heat dissipation.

Accordingly, one object of the present disclosure is to provide a wire harness that improves heat dissipation of electric wires.

Means for Solving the Problem

A wire harness that solves the above problem includes an electric wire and an exterior member. The electric wire includes a core wire and an insulation sheath. The core wire is formed by a conductor. The insulation sheath covers an outer circumference of the core wire. The electric wire is inserted through the exterior member. The electric wire includes a non-sheathed portion at an intermediate portion in a longitudinal direction of the electric wire where the insulation sheath is removed. The non-sheathed portion has an outer circumference covered by an insulative and meshed sheath member.

With this structure, the non-sheathed portion is covered by the meshed sheath member so that heat of the core wire is released to the outside through the mesh. This improves heat dissipation of the electric wire.

In the above wire harness, it is preferred that the sheath member be formed from a material having a higher wear resistance than the insulation sheath.

With this structure, the sheath member is formed from a material having higher wear resistance than the insulation sheath to avoid tearing of the sheath member even when the sheath member contacts the exterior member. This avoids exposure of the core wire.

In the above wire harness, it is preferred that the sheath member be formed by braiding reinforced fibers having a higher shearing resistance than the insulation sheath.

With this structure, the sheath member is formed by braiding reinforced fibers having higher shearing resistance than the insulation sheath. This reduces tearing in the sheath member.

In the above wire harness, it is preferred the non-sheathed portion and the sheath member be arranged at a bent portion of the exterior member.

With this structure, the sheath member is meshed and thus more flexible than a non-meshed structure. This allows the sheath member arranged at the bent portion to readily follow the bent portion. Further, the bent portion has a structure in which the sheath member readily contacts the braided member. Thus, as described above, it is preferred that the sheath member be formed from a material having higher wear resistance than the insulation sheath.

In the above wire harness, it is preferred that the core wire be squeezed and flattened into a flat portion at a position corresponding to the non-sheathed portion.

With this structure, the flat portion is arranged on the core wire so that the surface area of the core wire is increased compared to, for example, when the cross section of the core wire is a substantially true circle. This improves the heat dissipation.

In the above wire harness, it is preferred that the electric wire be one of a plurality of the same electric wires inserted through the exterior member. The core wires of the plurality of electric wires are collectively covered by one of the sheath member at a position corresponding to the non-sheathed portion.

With this structure, a single sheath member can collectively cover multiple core wires of the electric wires in an insulated state. This eliminates the need for a plurality of sheath members and limits increases in the number of parts.

Effect

The wire harness of the present disclosure improves heat disipation of the electric wire.

EMBODIMENT

Figure 1:
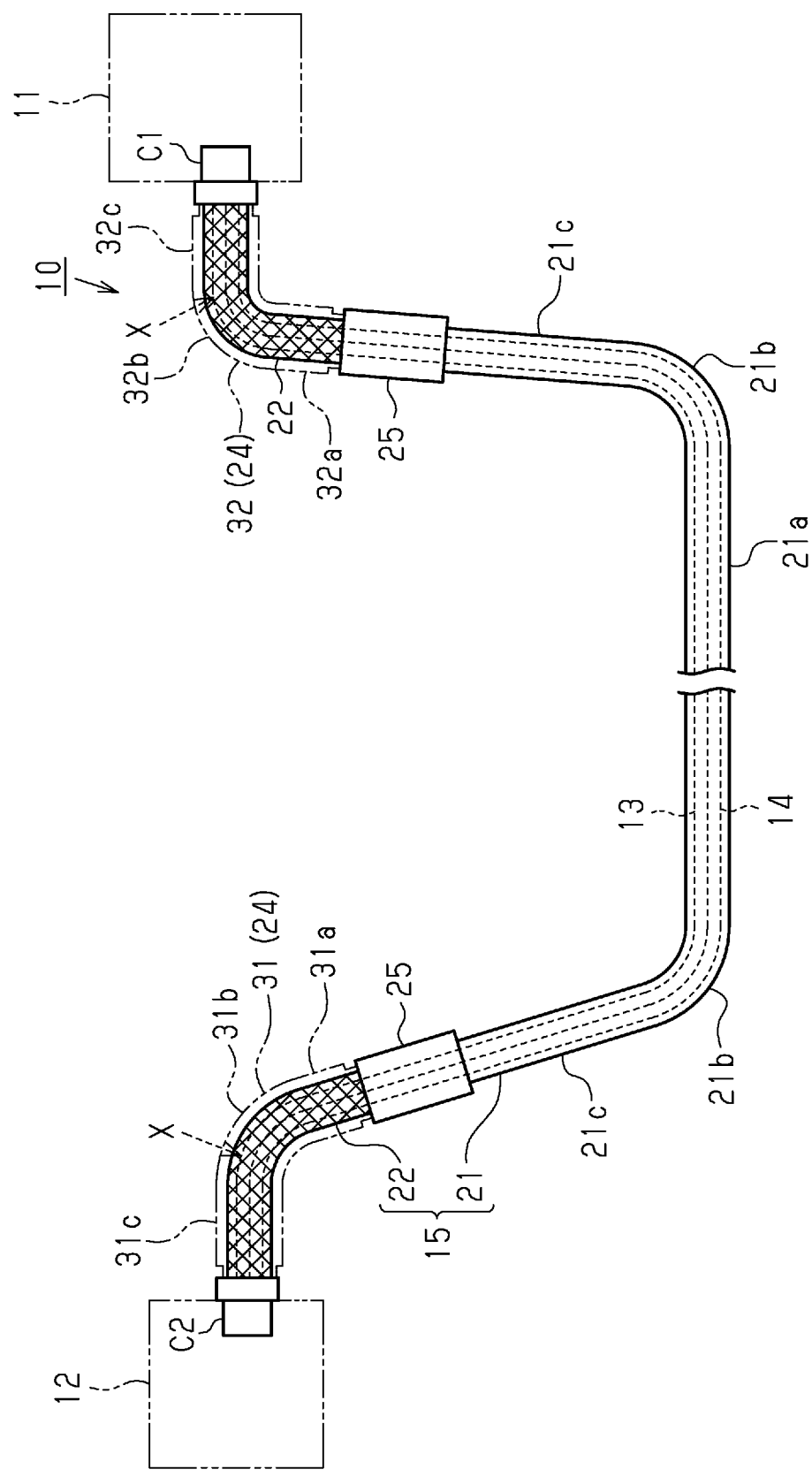
FIG. 1 is a schematic diagram showing a wire harness according to one embodiment.

One embodiment of a wire harness will now be described with reference to the drawings. The drawings may not be to scale, and the relative size, proportions, and depiction of elements in the drawings may be exaggerated or simplified for clarity, illustration, and convenience.

As shown in FIG. 1, a wire harness 10 of the present embodiment is laid out to extend under a floor or the like of a vehicle such as a hybrid car or an electric car to connect, for example, a high voltage battery 11 arranged at the rear of the vehicle and an inverter 12 arranged at the front of the vehicle. The inverter 12 is connected to a wheel driving motor (not shown) serving as a power source when the vehicle travels and generates alternating current from the direct current of the high voltage battery 11 to supply the alternating current to the motor. The high voltage battery 11 is a battery that is configured to supply a voltage of several hundred volts.

The wire harness 10 includes high voltage wires 13 and 14 and an electromagnetic shield 15. The high voltage wires 13 and 14 are respectively connected to the positive terminal and the negative terminal of the high voltage battery 11. The electromagnetic shield 15 is tubular and surrounds both of the high voltage wires 13 and 14. Each of the high voltage wires 13 and 14 is a non-shielded wire, which does not include a shielding structure, and is applicable to high voltages and large currents. The high voltage wires 13 and 14 are inserted through the electromagnetic shield 15. The high voltage wires 13 and 14 each include one end connected to the high voltage battery 11 by a connector C1 and another end connected to the inverter 12 by a connector C2.

The electromagnetic shield 15 is elongated and tubular. The electromagnetic shield 15 includes an intermediate portion in a longitudinal direction of the electromagnetic shield 15 formed by a metal pipe 21. The electromagnetic shield 15 in ranges including the two longitudinal ends of the electromagnetic shield 15 and excluding the portion formed by the metal pipe 21 is formed by braided members 22. The braided member 22 is an exterior member through which the high voltage wires 13 and 14 are inserted.

The metal pipe 21 is formed from, for example, an aluminum-based metal material. The metal pipe 21 is laid out under the floor of the vehicle and bent into a predetermined shape in correspondence with the structure of the floor. The metal pipe 21 of the present embodiment includes a straight portion 21a, bent portions 21b, and upwardly extending portions 21c. The straight portion 21a is laid out under the floor in a front-rear direction of the vehicle. The bent portions 21b are arranged at the ends of the straight portion 21a. The upwardly extending portions 21c extend from the bent portions 21b toward an upper side of the vehicle. The metal pipe 21 electromagnetically shields both of the inserted high voltage wires 13 and 14 and protects the high voltage wires 13 and 14 from flying pebbles or the like.

The braided members 22 are tubular members formed by braiding a plurality of metal strands. The braided members 22 are connected to the longitudinal ends of the metal pipe 21 by a coupling member such as a swaging ring or the like so that each braided member 22 is electrically connected to the metal pipe 21.

The outer circumference of each braided member 22 is surrounded by an exterior member 24 such as a corrugated tube. The exterior member 24 is separate from the braided member 22 through which the high voltage wires 13 and 14 are inserted. Further, rubber grommets 25 are attached to portions connecting the metal pipe 21 and the braided members 22 to cover the outer circumference of the connection portions and prevent the entrance of water.

The braided members 22 entirely surround the outer circumference of portions of the high voltage wires 13 and 14 extending out of the ends of the metal pipe 21 (out-of-pipe portions X). Accordingly, the braided member 22 electromagnetically shields the out-of-pipe portions X of the high voltage wires 13 and 14.

As shown in FIG. 1, the exterior members 24 of the present embodiment include a first exterior member 31 located toward the front of the vehicle and a second exterior member 32 located toward the rear of the vehicle.

The first exterior member 31 includes a first straight portion 31a, a bent portion 31b, and a second straight portion 31c. In at least a state arranged in the vehicle, the first straight portion 31a is connected to the metal pipe 21 extending straight and substantially upward in vertical direction. The bent portion 31b extends from the first straight portion 31a and is bent toward the front. The second straight portion 31c extends straight from the bent portion 31b toward the front.

The second exterior member 32 includes a first straight portion 32a, a bent portion 32b, and a second straight portion 32c. In at least a state arranged in the vehicle, the first straight portion 32a is connected to the metal pipe 21 extending straight and substantially upward in the vertical direction. The bent portion 31b extends from the first straight portion 31a and is bent toward the rear. The second straight portion 31c extends straight from the bent portion 31b toward the rear.

The structure of the high voltage wires 13 and 14 will now be described.

Figure 2:
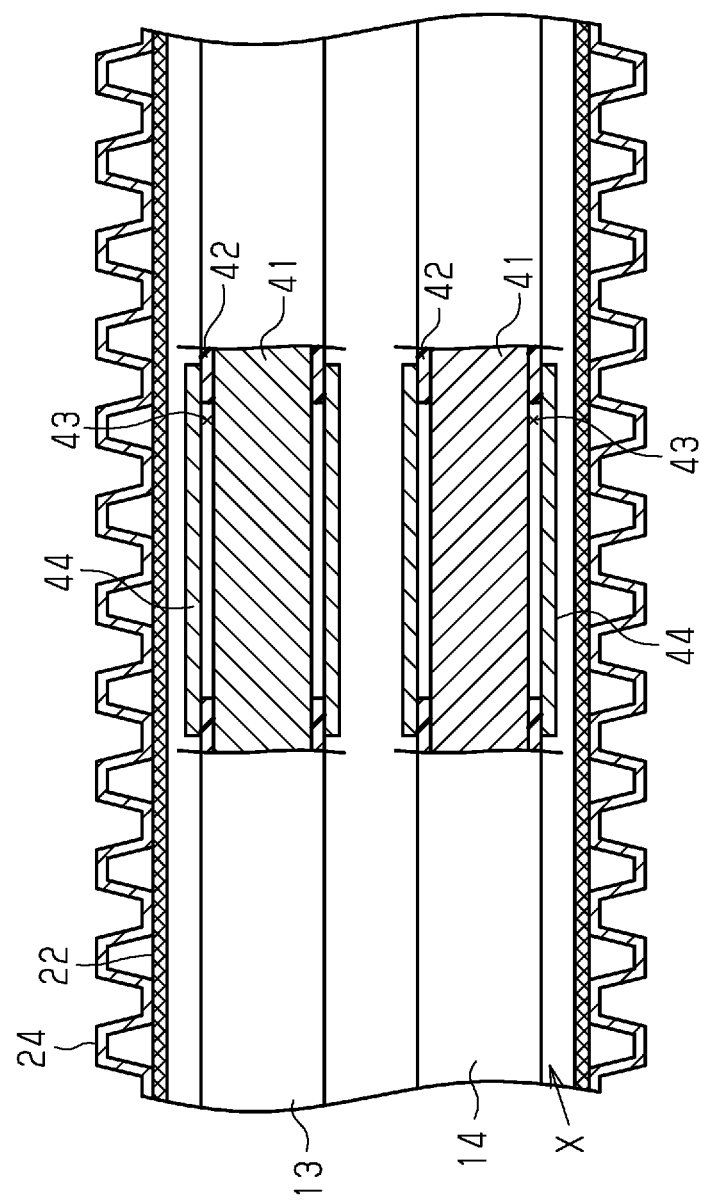
FIG. 2 is a cross-sectional view showing the wire harness of the same embodiment.

As shown in FIG. 2, each of the high voltage wires 13 and 14 is a sheathed electric wire in which a core wire 41 is covered by an insulation sheath 42. The core wire 41 is formed by a conductor, and the insulation sheath 42 is formed from a resin material. For example, a single-core wire or a stranded wire can be used as the core wire 41. The insulation sheath 42 is formed on the circumferential surface of the core wire 41 through, for example, extrusion coating, and covers the circumferential surface of the core wire 41 in a state of contact.

Further, the high voltage wires 13 and 14 each include an intermediate portion in the longitudinal direction defining a non-sheathed portion 43 where the insulation sheath 42 is not sheathed. The non-sheathed portion 43 has an outer circumference covered by an insulative meshed sheath member 44.

The sheath member 44 is configured to be tubular and covers each non-sheathed portion 43. The sheath member 44 is formed from, for example, a material having higher wear resistance than the insulation sheath 42. The sheath member 44 of the present example has a structure braiding reinforced fibers having superior insulation properties and superior wear resistance properties. That is, the sheath member 44 is meshed. Further, the sheath member 44 has a meshed structure and thereby has higher flexibility and dissipates more heat than the insulation sheath 42 that is not meshed.

Each sheath member 44 is long enough to entirely cover a single non-sheathed portion 43. Specifically, the two longitudinal ends of the sheath member 44 are overlapped with the insulation sheath 42 located at the two ends of each non-sheathed portion 43.

Preferably, the reinforced fibers forming the sheath member 44 have, for example, shearing resistance that is more superior to that of the insulation sheath 42. Examples of the reinforced fiber include para-aramid fiber, polyarylate fiber, poly para-phenylene benzobisoxazole (PBO) fiber, polyethylene terephthalate (PET) fiber, ultra-high molecular weight polyethylene fiber, polyetherimide (PEI) fiber, glass fiber, ceramic fiber, or the like. Preferably, one or more types of the above fibers are used in accordance with the physical property required for the sheath member 44. In the present embodiment, the sheath member 44 is formed from a single type of the para-aramid fiber.

Each non-sheathed portion 43 and the sheath member 44, which corresponds to the non-sheathed portion 43, can be arranged at any position in a longitudinally intermediate portion of each of the high of the voltage wires 13 and 14. The non-sheathed portion 43 and the sheath member 44 can be arranged, for example, at a position corresponding to the straight portion 21a of the metal pipe 21, the bent portion 21b of the metal pipe 21, or the first and second exterior members 31 and 32. The heat produced by the high voltage wires 13 and 14 (core wires 41) can readily be released through the meshing of the sheath members 44, for example, in a structure that includes the non-sheathed portion 43 of the high voltage wires 13 and 14 inside the first and second exterior members 31 and 32 and covers the outer side of the non-sheathed portions 43 with the meshed sheath members 44. It can be expected that this increases the heat dissipation at such a portion by approximately 5% to 10% compared to when the core wires 41 of the electric wires 13 and 14 remain covered by the insulation sheath 42.

Further, when laying out the wire harness 10 in the vehicle, the first and second exterior members 31 and 32 are bent to form the bent portions 31b and 32b. In this case, the high voltage wires 13 and 14 are inserted through the exterior members 31 and 32 in advance. The high voltage wires 13 and 14 each include the non-sheathed portion 43 at positions corresponding to the bent portions 31b and 32b of the exterior members 31 and 32 and the outer sides of the non-sheathed portions 43 are covered by the sheath members 44. The first and second exterior members 31 and 32 can be readily bent to form the bent portions 31b and 32b because the sheath member 44 is more flexible than the insulation sheath 42.

The operation of the present embodiment will now be described.

In the wire harness 10 of the present embodiment, the outer side of the core wire 41 at the non-sheathed portion 43, where the insulation sheath 42 is removed, is covered by the meshed sheath member 44. Thus, the heat produced by the core wire 41 is dissipated from the sheath member 44. Further, the sheath member 44 is formed from reinforced fibers having higher wear resistance than the insulation sheath 42. This avoids tearing of the sheath member 44 even when the sheath member 44 contacts (slides on) the exterior member 24 or the braided member 22.

The advantages of the present embodiment will now be described.

(1) The non-sheathed portion 43 is covered by the meshed sheath member 44 so that heat of the core wire 41 is released to the outside through the mesh. This improves heat dissipation of the electric wires 13 and 14.

(2) The sheath member 44 is formed from a material having higher wear resistance than the insulation sheath 42 to avoid tearing of the sheath member 44 even when the sheath member 44 contacts the braided member 22 or the exterior member 24. This avoids exposure of the core wire 41.

(3) The sheath member 44, which is formed from braided reinforced fibers having higher shearing resistance than the insulation sheath 42, avoids tearing in the sheath member 44. This avoids situations in which the core wires 41 of the high voltage wires 13 and 14, which are covered by the sheath members 44, directly contact each other or are short-circuited through other components or the like.

(4) The sheath member 44 is meshed and is more flexible than a non-meshed structure. Thus, the sheath members 44 readily follow the bent portions 31b and 32b even when the sheath members 44 are located at the bent portions 31b and 32b of the exterior member 24. Further, the bent portions 31b and 32b have a structure in which the sheath members 44 readily contact the braided members 22 or the exterior members 24. Thus, as described above, it is preferred that the sheath members 44 be formed from a material having higher wear resistance than the insulation sheath 42.

The above-described embodiment may be modified as follows.

The above embodiment employs the braided members 22 and the exterior member 24 as the exterior members of the electric wires 13 and 14, which are covered by the sheath members 44. However, this may be changed. For example, the braided members 22 may be omitted if the electromagnetic shielding is not necessary. Further, the exterior members 24 may be omitted so that only the braided members 22 are used.

Alternatively, the metal pipe 21 may be employed as an exterior member that is separate from the braided members 22 and the exterior members 24. Further, the non-sheathed portion 43 may be arranged on the electric wires 13 and 14 inside the metal pipe 21 so that the sheath member 44 covers the core wire 41 at positions corresponding to the non-sheathed portion 43. In such a structure, the sheath member 44 may be in contact with the metal pipe 21. When the sheath member 44 is in contact with the metal pipe 21, heat can be released through the metal pipe 21. This improves heat dissipation.

Figure 3A:
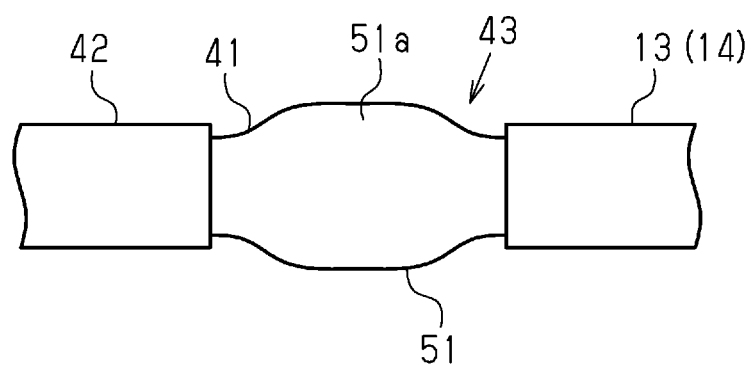
FIG. 3A is a plan view showing an electric wire of a modified example.
Figure 3B:
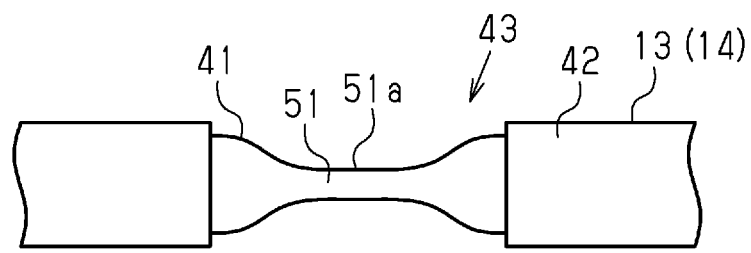
FIG. 3B is a side view showing the electric wire of the same modified example.

As shown in FIGS. 3A and 3B, the core wire 41 at positions corresponding to the non-sheathed portion 43 may be squeezed and flattened to include a flat portion 51. With this structure, the cross section of the core wire 41 is changed, for example, from a substantially circular shape to a substantially elliptic shape thereby increasing the surface area. This improves the heat dissipation effect of the core wire 41. Further, the core wire 41 can readily be bent in a direction toward which a main surface 51a of the flat portion 51 faces (direction orthogonal to main surface 51a) so that the formation of the bent portions 31b and 32b will not be hampered when the bent portions 31b and 32b are bent in the same direction.

In the above embodiment, the sheath member 44 is tubular but may have another shape. For example, a twisted tube including a slit extending in the longitudinal direction (longitudinal direction of electric wires 13 and 14) may be employed as the sheath member 44. The twisted tube is braided and thus meshed in the same manner as the sheath member 44 of the embodiment. When using such a sheath member 44 including a slit, for example, the two ends of the sheath member 44 in the longitudinal direction of the electric wires 13 and 14 may be fixed by wrapping with a tape.

In the above embodiment, portions of the core wire 41 corresponding to the non-sheathed portions 43 of the high voltage wires 13 and 14 are each covered by the sheath member 44. However, the structure may be changed. A structure in which a single sheath member covers multiple core wires may be employed as long as the insulation between the core wires 41 is maintained. One example of the above structure will be now described with reference to FIG. 4.

Figure 4:
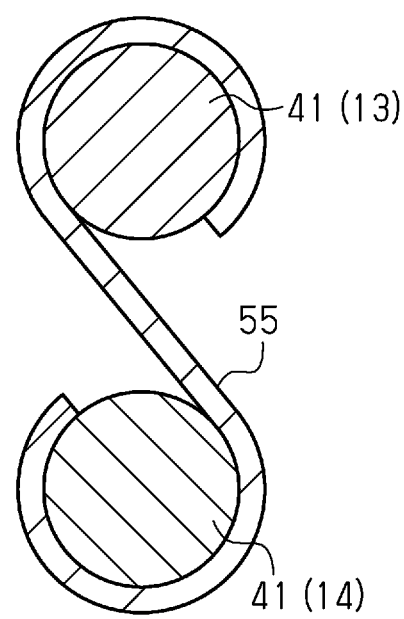
FIG. 4 is a cross-sectional view showing a wire harness of a modified example.

As shown in FIG. 4, a sheet-like sheath member 55 may be wound around the core wires 41 of the electric wires 13 and 14 in in correspondence with the non-sheathed portions 43 (not shown). In the example shown in FIG. 4, the sheath member 55 is wound to have a substantially S-shaped cross section taken in the radial direction of the core wires 41. The sheath member 55 is located between the core wires 41 of the electric wires 13 and 14 to maintain the insulation between the core wires 41. In this manner, a single sheath member 55 can collectively cover the core wires 41 of multiple electric wires 13 and 14 in an insulated state. This eliminates the need for a plurality of sheath members and limits increases in the number of parts.

In the above embodiment, each portion of the core wire 41 corresponding to the non-sheathed portion 43 of the electric wires 13 and 14 is covered by the sheath member 44. Alternatively, only one of the core wires 41 may be covered by the sheath member 44.

Although not particularly indicated in the above embodiment, any number of non-sheathed portions 43 may be arranged on the electric wires 13 and 14 and any number of the sheath members 44 may be used corresponding to the non-sheathed portions 43 as long as the number is greater than or equal to one. For example, the arrangement of a plurality of the non-sheathed portions 43 and the sheath members 44 that correspond to the non-sheathed portions 43 improves the heat dissipation. Particularly, in a structure in which the exterior member is bent at multiple locations to form multiple bent portions, it is preferred that the non-sheathed portion 43 and the sheath member 44 that correspond to the non-sheathed portion 43 be arranged at each bent portion.

In the wire harness 10 of the above embodiment, two electric wires, namely, the high voltage wires 13 and 14 are inserted through the electromagnetic shield 15. However, the structure of the electric wires inserted through the electromagnetic shield 15 may be changed in accordance with the vehicle structure. For example, a low voltage wire may be added and inserted through the electromagnetic shield 15 to connect a low voltage battery and various types of low voltage devices (e.g. lamp, vehicle audio, or the like).

The positional relationship of the high voltage battery 11 and the inverter 12 in the vehicle is not limited to the above embodiment and may be changed in accordance with the vehicle structure. Further, in the above embodiment, the high voltage battery 11 is connected to the inverter 12 with the high voltage wires 13 and 14. Instead, the high voltage battery 11 may be connected to a high voltage device, which is not the inverter 12.

In the above embodiment, the present disclosure is applied to the wire harness 10 that connects the high voltage battery 11 and the inverter 12. However, the present disclosure may also be applied to a wire harness that connects the inverter 12 and a wheel driving motor.

The above embodiment and the modifications may be combined.

It should be apparent to those skilled in the art that the present disclosure may be embodied in many other specific forms without departing from the technical concepts of the disclosure. For example, components described in the embodiment (or one or more of its modifications) may be partially omitted or combined. The scope of the disclosure is intended to embrace all such alternatives, modifications, and variations, along with all equivalents thereof, within the scope of the claims.

DESCRIPTION OF REFERENCE CHARACTERS

10) wire harness; 13, 14) high voltage electric wire (electric wire); 21) metal pipe (exterior member); 21b) bent portion; 22) braided member (exterior member); 24) exterior member; 31, 32) first and second exterior members (exterior member); 31b, 32b) bent portion, 41) core wire; 42) insulation sheath; 43) non-sheathed portion; 44) sheath member; 51) flat portion, 55) sheath member

The invention claimed is:

1. A wire harness, comprising: an electric wire including a core wire, which is formed by a conductor, and an insulation sheath, which covers an outer circumference of the core wire; and an exterior member into which the electric wire is inserted, wherein the electric wire includes a non-sheathed portion at an intermediate portion in a longitudinal direction of the electric wire where the insulation sheath is removed, and the non-sheathed portion has an outer circumference covered by an insulative and meshed sheath member, wherein the sheath member is formed by braiding reinforced fibers having a higher shearing resistance than the insulation sheath.

2. The wire harness according to claim 1, wherein the sheath member is formed from a material having a higher wear resistance than the insulation sheath.

3. The wire harness according to claim 1, wherein the non-sheathed portion and the sheath member are arranged at a bent portion of the exterior member.

4. The wire harness according to claim 1, wherein the core wire is squeezed and flattened into a flat portion at a position corresponding to the non-sheathed portion.

5. The wire harness according to claim 1, wherein the electric wire is one of a plurality of the same electric wires inserted through the exterior member, and the core wires of the plurality of electric wires are collectively covered by one of the sheath member at a position corresponding to the non-sheathed portion.

* * * * *